(12) United States Patent
Laaksonen et al.

(10) Patent No.: US 12,014,743 B2
(45) Date of Patent: Jun. 18, 2024

(54) SPATIAL AUDIO PARAMETER MERGING

(71) Applicant: Nokia Technologies Oy, Espoo (FI)

(72) Inventors: Lasse Laaksonen, Tampere (FI); Anssi Ramo, Tampere (FI); Mikko-Ville Laitinen, Espoo (FI); Tapani Pihlajakuja, Vantaa (FI)

(73) Assignee: Nokia Technogies Oy, Espoo (FI)

( * ) Notice: Subject to any disclaimer, the term of this patent is extended or adjusted under 35 U.S.C. 154(b) by 0 days.

(21) Appl. No.: 17/058,699

(22) PCT Filed: May 29, 2019

(86) PCT No.: PCT/FI2019/050413
§ 371 (c)(1),
(2) Date: Nov. 25, 2020

(87) PCT Pub. No.: WO2019/229299
PCT Pub. Date: Dec. 5, 2019

(65) Prior Publication Data
US 2021/0210104 A1 Jul. 8, 2021

(30) Foreign Application Priority Data
May 31, 2018 (GB) ...................................... 1808929

(51) Int. Cl.
*G06F 3/16* (2006.01)
*G10L 19/008* (2013.01)
(Continued)

(52) U.S. Cl.
CPC ............ *G10L 19/008* (2013.01); *G06F 3/165* (2013.01); *H04R 3/005* (2013.01)

(58) Field of Classification Search
CPC ..... G10L 19/008; G10L 19/00; G10L 19/167; G10L 19/16; G06F 3/165; G06F 3/16;
(Continued)

(56) References Cited

U.S. PATENT DOCUMENTS 10,477,311 B2  11/2019 Vilkamo ............................ 5/27
2009/0262957 A1*  10/2009 Oh ............................ H04S 7/30
381/119
(Continued)

FOREIGN PATENT DOCUMENTS

CA   2967249 A1 *  6/2016  ......... H04N 21/2365
CN   102007533 A    4/2011
(Continued)

OTHER PUBLICATIONS

Laitinen, et al. "Converting 5.1 Audio Recordings to B-Format for Directional Audio Coding Reproduction", IEEE ICASSP, pp. 61-64, IDS, May, (Year: 2011).*
(Continued)

*Primary Examiner* — Leshui Zhang
(74) *Attorney, Agent, or Firm* — Harrington & Smith

(57) ABSTRACT

An apparatus including circuitry configured for determining for at least one first audio signal of an audio signal format, at least one metadata parameter; determining for at least one further audio signal of a further audio signal format; at least one further metadata parameter; controlling combining of the at least one metadata parameter with the at least one further metadata parameter to generate a combined metadata, wherein the combined metadata is configured to be associated with a combined audio signal formed from the at least one first audio signal and the at least one further audio signal in such a way that the combined metadata includes at least one spatial audio parameter.

20 Claims, 10 Drawing Sheets

(51) Int. Cl.
*H04R 3/00* (2006.01)
*H04S 3/00* (2006.01)
*H04S 7/00* (2006.01)

(58) Field of Classification Search
CPC ......... H04R 3/005; H04R 3/00; H04R 27/00; H04S 7/302; H04S 7/00; H04S 7/303; H04S 7/304; H04S 2400/03; H04S 2400/13; H04S 2400/15; H04S 2420/03; H04S 3/00; H04S 3/02
USPC ......... 704/500–504; 381/1–23, 312–321, 74, 381/61, 63, 77, 80, 81, 82, 89, 332, 101, 381/102, 104, 105, 107, 108, 109, 110, 381/111, 116, 117, 119; 700/94
See application file for complete search history.

(56) References Cited

U.S. PATENT DOCUMENTS

| | | | | |
|---|---|---|---|---|
| 2011/0216908 A1* | 9/2011 | Galdo | ............... | G10L 19/008 381/17 |
| 2013/0170672 A1* | 7/2013 | Groeschel | ............ | H03G 3/3089 381/119 |
| 2013/0216070 A1 | 8/2013 | Keiler et al. | ................. | 381/300 |
| 2015/0245153 A1 | 8/2015 | Malak et al. | | |
| 2017/0251321 A1* | 8/2017 | Samuelsson | ............ | G10L 21/00 |
| 2019/0132674 A1 | 5/2019 | Vilkamo | ............................... | 3/5 |

FOREIGN PATENT DOCUMENTS

| | | |
|---|---|---|
| CN | 103119846 A | 5/2013 |
| EP | 2111062 A1 | 10/2009 |
| EP | 2 324 645 | 2/2010 |
| EP | 2 619 904 | 7/2014 |
| GB | 2549532 A | 10/2017 |
| WO | WO 2017/182714 A1 | 10/2017 |

OTHER PUBLICATIONS

ETSI TS 101 154 V2.4.1 (Feb. 2018), "Digital Video Broadcasting (DVB); Specification for the use of Video and Audio Coding in Broadcast and Broadband Applications", EBU Operating Eurovision, 291 pgs.

Laitinen, Mikko-Ville, et al., "Converting 5.1 Audio Recordings to B-Format for Directional Audio Coding Reproduction", IEEE ICASSP, May 2011, pp. 61-64.

Office Action dated Jan. 5, 2024 in European Patent Application No. 19 812 566.8, 7 pages.

* cited by examiner

SPATIAL AUDIO PARAMETER MERGING

CROSS REFERENCE TO RELATED APPLICATION

This patent application is a U.S. National Stage application of International Patent Application Number PCT/FI2019/050413 filed May 29, 2019, which is hereby incorporated by reference in its entirety, and claims priority to GB 1808929.2 filed May 31, 2018.

FIELD

The present application relates to apparatus and methods for sound-field related parameter estimation in frequency bands, but not exclusively for time-frequency domain sound-field related parameter estimation for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for describing spatial audio.

SUMMARY

There is provided according to a first aspect an apparatus comprising means for: determining for at least one first audio signal of an audio signal format, at least one metadata parameter; determining for at least one further audio signal of a further audio signal format; at least one further metadata parameter; controlling combining of the at least one metadata parameter with the at least one further metadata parameter to generate a combined metadata, wherein the combined metadata is configured to be associated with a combined audio signal formed from the at least one first audio signal and the at least one further audio signal in such a way that the combined metadata comprises at least one spatial audio parameter.

The means for determining for at least one first/further audio signal at least one metadata parameter may be further for at least one of: receiving at least one metadata parameter associated with the at least one first/further audio signal; analysing the at least one first/further audio signal to determine the at least one metadata parameter; and decoding the at least one first/further audio signal to determine the at least one metadata parameter.

The means for controlling combining of the at least one metadata parameter associated with the first audio signal with the at least one metadata parameter associated with the further audio signal to generate a combined metadata may be for: extracting the at least one metadata parameter comprising at least one spatial audio parameter, the metadata parameter associated with the at least one first/further audio signal as a metadata block; adding the extracted at least one metadata parameter comprising at least one spatial audio parameter, the metadata parameter associated with the at least one first or further audio signal as a secondary metadata block within the metadata associated with the at least one further/first audio signal respectively.

The means for extracting the at least one metadata parameter comprising at least one spatial audio parameter, the metadata parameter associated with the at least one first/further audio signal as a metadata block may be for extracting at least one of: at least one direction parameter; at least one energy ratio parameter; and at least one coherence parameter associated with the at least one first/further audio signal as the metadata block, and wherein adding the extracted at least one metadata parameter comprising at least one spatial audio parameter, the metadata parameter associated with the first/further audio signal as a secondary metadata block within the metadata associated with the at least one further/first audio signal respectively may be for: appending the at least one of: the at least one direction parameter; at least one energy ratio parameter; and at least one coherence parameter associated with the at least one first/further audio signal as the secondary metadata block within the metadata associated with the at least one further/first audio signal, the metadata associated with the at least one further/first audio signal may also comprise: at least one primary metadata block comprising at least one spatial audio parameter associated with the at least one further/first audio signal, the at least one spatial audio parameter associated with the at least one further/first audio signals comprising at least one of: at least one direction parameter; at least one energy ratio parameter; and at least one coherence parameter associated with the further/first audio signal; and a common metadata block associated with the at least one further/first audio signal comprising at least one non-spatial audio related parameter, the at least one non-spatial audio related parameter comprising at least one of: a version identifier; a time-frequency resolution identifier; a number of directions identifier.

The means for controlling combining of the at least one metadata parameter with the at least one further metadata parameter to generate a combined metadata may be for: determining at least one first signal ratio associated with at least one metadata parameter associated with the at least one first audio signal; generating at least one first signal weight based on the at least one first signal ratio; determining at least one further ratio associated with at least one metadata parameter associated with the at least one further audio signal; generating at least one further signal weight based on the at least one further signal ratio; comparing the at least one first signal weight and the at least one further signal weight; and generating the combined metadata based on the comparing the at least one first signal weight and the at least one further signal weight.

The means for generating the combined metadata based on the comparing the at least one first signal weight and the at least one further signal weight may be for: using the at least one metadata parameter associated with the at least one first audio signal as the combined metadata when the comparing indicates the at least one first signal weight is greater than the at least one further signal weight by a determined threshold; using the at least one metadata parameter associated with the at least one further audio signal as the combined metadata when the comparing indicates the at least one further signal weight is greater than the at least one first signal weight by a further determined threshold; generating a weighted average of the at least one metadata parameter associated with the at least one first audio signal and the at least one metadata parameter associated with the at least one further audio signal when the comparing indicates otherwise.

The means for controlling combining of the at least one metadata parameter associated with the at least one first audio signal with the at least one metadata parameter associated with the at least one further audio signal to generate a combined metadata may be further for: determining at least one first signal energy associated with the at least one metadata parameter associated with the at least one first audio signal; determining at least one further signal energy associated with the at least one metadata parameter associated with the at least one further audio signal, wherein the means for generating at least one first signal weight based on the at least one first signal ratio is further based on the at least one first signal energy, wherein the means for generating at least one further signal weight based on the at least one further signal ratio is further based on the at least one further signal energy.

The means for controlling combining of the at least one metadata parameter associated with the at least one first audio signal with the at least one metadata parameter associated with the further audio signal to generate a combined metadata may be further for: determining at least one first signal user input associated with the at least one metadata parameter associated with the at least one first audio signal; determining at least one further signal user input associated with the at least one metadata parameter associated with the at least one further audio signal, wherein the means for generating at least one first signal weight based on the at least one first signal ratio may be further based on the at least one first user input energy, wherein the means for generating at least one further signal weight based on the at least one further signal ratio may be further based on the at least one further signal user input.

The means for controlling combining of the at least one metadata parameter associated with the at least one first audio signal with the at least one metadata parameter associated with the at least one further audio signal to generate a combined metadata may be further for: determining at least one first signal server input associated with the at least one metadata parameter associated with the at least one first audio signal; determining at least one further signal server input associated with the at least one metadata parameter associated with the at least one further audio signal, wherein the means for generating at least one first signal weight based on the at least one first signal ratio is further based on the at least one first server input energy, wherein the means for generating at least one further signal weight based on the at least one further signal ratio may be further based on the at least one further signal server input.

The means for may be further for combining of the at least one metadata parameter associated with the at least one first audio signal with the at least one at least one metadata parameter associated with the at least one further audio signal to generate a combined metadata.

The at least one first audio signal of an audio signal format may be at least one of: 2–N channels of a spatial microphone array; 2–N channels of multi-channel audio signal; a first order ambisonics signal; a higher order ambisonics signal; and a spatial audio signal.

The at least one further audio signal of a further audio signal format may be at least one of: 2–N channels of a spatial microphone array; 2–N channels of multi-channel audio signal; a first order ambisonics signal; a higher order ambisonics signal; and a spatial audio signal.

The means for controlling combining of the at least one metadata parameter with the at least one further metadata parameter to generate a combined metadata, may be such that the combined metadata comprises at least one spatial audio parameter and at least one non-spatial audio related parameter.

According to a second aspect there is provided an apparatus comprising at least one processor and at least one memory including a computer program code, the at least one memory and the computer program code configured to, with the at least one processor, cause the apparatus at least to: determine for at least one first audio signal of an audio signal format, at least one metadata parameter; determine for at least one further audio signal of a further audio signal format; at least one further metadata parameter; control a combination of the at least one metadata parameter with the at least one further metadata parameter to generate a combined metadata, wherein the combined metadata is configured to be associated with a combined audio signal formed from the at least one first audio signal and the at least one further audio signal in such a way that the combined metadata comprises at least one spatial audio parameter.

The apparatus caused to determine for at least one first/further audio signal at least one metadata parameter may be further caused to perform at least one of: receive at least one metadata parameter associated with the at least one first/further audio signal; analyse the at least one first/further audio signal to determine the at least one metadata parameter; and decode the at least one first/further audio signal to determine the at least one metadata parameter.

The apparatus caused to control the combination of the at least one metadata parameter associated with the first audio signal with the at least one metadata parameter associated with the further audio signal to generate a combined metadata may be further caused to: extract the at least one metadata parameter comprising at least one spatial audio parameter, the metadata parameter associated with the at least one first/further audio signal as a metadata block; add the extracted at least one metadata parameter comprising at least one spatial audio parameter, the metadata parameter associated with the at least one first or further audio signal as a secondary metadata block within the metadata associated with the at least one further/first audio signal respectively.

The apparatus caused to extract the at least one metadata parameter comprising at least one spatial audio parameter, the metadata parameter associated with the at least one first/further audio signal as a metadata block may be caused to extract at least one of: at least one direction parameter; at least one energy ratio parameter; and at least one coherence parameter associated with the at least one first/further audio signal as the metadata block, and wherein the apparatus caused to add the extracted at least one metadata parameter comprising at least one spatial audio parameter, the metadata parameter associated with the first/further audio signal as a secondary metadata block within the metadata associated with the at least one further/first audio signal respectively may be further caused to: append the at least one of: the at least one direction parameter; at least one energy ratio parameter; and at least one coherence parameter associated with the at least one first/further audio signal as the secondary metadata block within the metadata associated with the at least one further/first audio signal, the metadata associated with the at least one further/first audio signal may also comprise: at least one primary metadata block comprising at least one spatial audio parameter associated with the at least one further/first audio signal, the at least one spatial audio parameter associated with the at least one further/first audio signals may comprise at least one of: at least one direction parameter; at least one energy ratio parameter; and at least one coherence parameter associated with the further/first audio signal; and a common metadata block associated with the at least one further/first audio signal may comprise at least one non-spatial audio related parameter, the at least one non-spatial audio related parameter comprising at least one of: a version identifier; a time-frequency resolution identifier; a number of directions identifier.

The apparatus caused to control the combination of the at least one metadata parameter with the at least one further metadata parameter to generate a combined metadata may be caused to: determine at least one first signal ratio associated with at least one metadata parameter associated with the at least one first audio signal; generate at least one first signal weight based on the at least one first signal ratio; determine at least one further ratio associated with at least one metadata parameter associated with the at least one further audio signal; generate at least one further signal weight based on the at least one further signal ratio; compare the at least one first signal weight and the at least one further signal weight; and generate the combined metadata based on the comparing the at least one first signal weight and the at least one further signal weight.

The apparatus caused to generate the combined metadata based on the comparing the at least one first signal weight and the at least one further signal weight may be caused to: use the at least one metadata parameter associated with the at least one first audio signal as the combined metadata when the comparing indicates the at least one first signal weight is greater than the at least one further signal weight by a determined threshold; use the at least one metadata parameter associated with the at least one further audio signal as the combined metadata when the comparing indicates the at least one further signal weight is greater than the at least one first signal weight by a further determined threshold; generate a weighted average of the at least one metadata parameter associated with the at least one first audio signal and the at least one metadata parameter associated with the at least one further audio signal when the comparing indicates otherwise.

The apparatus caused to control the combination of the at least one metadata parameter associated with the at least one first audio signal with the at least one metadata parameter associated with the at least one further audio signal to generate a combined metadata may be further caused to: determine at least one first signal energy associated with the at least one metadata parameter associated with the at least one first audio signal; determine at least one further signal energy associated with the at least one metadata parameter associated with the at least one further audio signal, wherein the apparatus caused to generate at least one first signal weight based on the at least one first signal ratio may be further based on the at least one first signal energy, wherein the apparatus caused to generate at least one further signal weight based on the at least one further signal ratio may be further based on the at least one further signal energy.

The apparatus caused to control the combination of the at least one metadata parameter associated with the at least one first audio signal with the at least one metadata parameter associated with the further audio signal to generate a combined metadata may be further caused to: determine at least one first signal user input associated with the at least one metadata parameter associated with the at least one first audio signal; determine at least one further signal user input associated with the at least one metadata parameter associated with the at least one further audio signal, wherein the apparatus caused to generate at least one first signal weight based on the at least one first signal ratio may be further based on the at least one first user input energy, wherein the apparatus caused to generate at least one further signal weight based on the at least one further signal ratio may be further based on the at least one further signal user input.

The apparatus caused to control the combination of the at least one metadata parameter associated with the at least one first audio signal with the at least one metadata parameter associated with the at least one further audio signal to generate a combined metadata may be caused to: determine at least one first signal server input associated with the at least one metadata parameter associated with the at least one first audio signal; determine at least one further signal server input associated with the at least one metadata parameter associated with the at least one further audio signal, wherein the apparatus caused to generate at least one first signal weight based on the at least one first signal ratio may be further based on the at least one first server input energy, wherein the apparatus caused to generate at least one further signal weight based on the at least one further signal ratio may be further based on the at least one further signal server input.

The apparatus may be further caused to combine the at least one metadata parameter associated with the at least one first audio signal with the at least one at least one metadata parameter associated with the at least one further audio signal to generate a combined metadata.

The at least one first audio signal of an audio signal format may be at least one of: 2-N channels of a spatial microphone array; 2-N channels of multi-channel audio signal; a first order ambisonics signal; a higher order ambisonics signal; and a spatial audio signal.

The at least one further audio signal of a further audio signal format may be at least one of: 2-N channels of a spatial microphone array; 2-N channels of multi-channel audio signal; a first order ambisonics signal; a higher order ambisonics signal; and a spatial audio signal.

The apparatus caused to control the combination of the at least one metadata parameter with the at least one further metadata parameter to generate a combined metadata, may be such that the combined metadata comprises at least one spatial audio parameter and at least one non-spatial audio related parameter.

According to a third aspect there is provided a method comprising: determining for at least one first audio signal of an audio signal format, at least one metadata parameter; determining for at least one further audio signal of a further audio signal format; at least one further metadata parameter; controlling combining of the at least one metadata parameter with the at least one further metadata parameter to generate a combined metadata, wherein the combined metadata is configured to be associated with a combined audio signal formed from the at least one first audio signal and the at least one further audio signal in such a way that the combined metadata comprises at least one spatial audio parameter.

Determining for at least one first/further audio signal at least one metadata parameter may further comprise at least one of: receiving at least one metadata parameter associated with the at least one first/further audio signal; analysing the at least one first/further audio signal to determine the at least one metadata parameter; and decoding the at least one first/further audio signal to determine the at least one metadata parameter.

Controlling combining of the at least one metadata parameter associated with the first audio signal with the at least one metadata parameter associated with the further audio signal to generate a combined metadata may further comprise: extracting the at least one metadata parameter comprising at least one spatial audio parameter, the metadata parameter associated with the at least one first/further audio signal as a metadata block; adding the extracted at least one metadata parameter comprising at least one spatial audio parameter, the metadata parameter associated with the at least one first or further audio signal as a secondary metadata block within the metadata associated with the at least one further/first audio signal respectively.

Extracting the at least one metadata parameter comprising at least one spatial audio parameter, the metadata parameter associated with the at least one first/further audio signal as a metadata block may further comprise extracting at least one of: at least one direction parameter; at least one energy ratio parameter; and at least one coherence parameter associated with the at least one first/further audio signal as the metadata block, and wherein adding the extracted at least one metadata parameter comprising at least one spatial audio parameter, the metadata parameter associated with the first/further audio signal as a secondary metadata block within the metadata associated with the at least one further/first audio signal respectively may further comprise: appending the at least one of: the at least one direction parameter; at least one energy ratio parameter; and at least one coherence parameter associated with the at least one first/further audio signal as the secondary metadata block within the metadata associated with the at least one further/first audio signal, the metadata associated with the at least one further/first audio signal may also comprise: at least one primary metadata block comprising at least one spatial audio parameter associated with the at least one further/first audio signal, the at least one spatial audio parameter associated with the at least one further/first audio signals comprising at least one of: at least one direction parameter; at least one energy ratio parameter; and at least one coherence parameter associated with the further/first audio signal; and a common metadata block associated with the at least one further/first audio signal comprising at least one non-spatial audio related parameter, the at least one non-spatial audio related parameter comprising at least one of: a version identifier; a time-frequency resolution identifier; a number of directions identifier.

Controlling combining of the at least one metadata parameter with the at least one further metadata parameter to generate a combined metadata may further comprise: determining at least one first signal ratio associated with at least one metadata parameter associated with the at least one first audio signal; generating at least one first signal weight based on the at least one first signal ratio; determining at least one further ratio associated with at least one metadata parameter associated with the at least one further audio signal; generating at least one further signal weight based on the at least one further signal ratio; comparing the at least one first signal weight and the at least one further signal weight; and generating the combined metadata based on the comparing the at least one first signal weight and the at least one further signal weight.

Generating the combined metadata based on the comparing the at least one first signal weight and the at least one further signal weight may further comprise: using the at least one metadata parameter associated with the at least one first audio signal as the combined metadata when the comparing indicates the at least one first signal weight is greater than the at least one further signal weight by a determined threshold; using the at least one metadata parameter associated with the at least one further audio signal as the combined metadata when the comparing indicates the at least one further signal weight is greater than the at least one first signal weight by a further determined threshold; generating a weighted average of the at least one metadata parameter associated with the at least one first audio signal and the at least one metadata parameter associated with the at least one further audio signal when the comparing indicates otherwise.

Controlling combining of the at least one metadata parameter associated with the at least one first audio signal with the at least one metadata parameter associated with the at least one further audio signal to generate a combined metadata may further comprise: determining at least one first signal energy associated with the at least one metadata parameter associated with the at least one first audio signal; determining at least one further signal energy associated with the at least one metadata parameter associated with the at least one further audio signal, wherein generating at least one first signal weight based on the at least one first signal ratio may be further based on the at least one first signal energy, wherein generating at least one further signal weight based on the at least one further signal ratio may be further based on the at least one further signal energy.

Controlling combining of the at least one metadata parameter associated with the at least one first audio signal with the at least one metadata parameter associated with the further audio signal to generate a combined metadata may further comprise: determining at least one first signal user input associated with the at least one metadata parameter associated with the at least one first audio signal; determining at least one further signal user input associated with the at least one metadata parameter associated with the at least one further audio signal, wherein generating at least one first signal weight based on the at least one first signal ratio may be further based on the at least one first user input energy, wherein generating at least one further signal weight based on the at least one further signal ratio may be further based on the at least one further signal user input.

Controlling combining of the at least one metadata parameter associated with the at least one first audio signal with the at least one metadata parameter associated with the at least one further audio signal to generate a combined metadata may further comprise: determining at least one first signal server input associated with the at least one metadata parameter associated with the at least one first audio signal; determining at least one further signal server input associated with the at least one metadata parameter associated with the at least one further audio signal, wherein generating at least one first signal weight based on the at least one first signal ratio may be further based on the at least one first server input energy, wherein generating at least one further signal weight based on the at least one further signal ratio may be further based on the at least one further signal server input.

The method may further comprise combining of the at least one metadata parameter associated with the at least one first audio signal with the at least one at least one metadata parameter associated with the at least one further audio signal to generate a combined metadata.

The at least one first audio signal of an audio signal format may be at least one of: 2–N channels of a spatial microphone array; 2–N channels of multi-channel audio signal; a first order ambisonics signal; a higher order ambisonics signal; and a spatial audio signal.

The at least one further audio signal of a further audio signal format may be at least one of: 2–N channels of a spatial microphone array; 2–N channels of multi-channel audio signal; a first order ambisonics signal; a higher order ambisonics signal; and a spatial audio signal.

Controlling combining of the at least one metadata parameter with the at least one further metadata parameter to generate a combined metadata, may be such that the combined metadata comprises at least one spatial audio parameter and at least one non-spatial audio related parameter.

According to a fourth aspect there is provided a computer program comprising instructions [or a computer readable medium comprising program instructions] for causing an apparatus to perform at least the following: determining for at least one first audio signal of an audio signal format, at least one metadata parameter; determining for at least one further audio signal of a further audio signal format; at least one further metadata parameter; controlling combining of the at least one metadata parameter with the at least one further metadata parameter to generate a combined metadata, wherein the combined metadata is configured to be associated with a combined audio signal formed from the at least one first audio signal and the at least one further audio signal in such a way that the combined metadata comprises at least one spatial audio parameter.

According to a fifth aspect there is provided a non-transitory computer readable medium comprising program instructions for causing an apparatus to perform at least the following: determining for at least one first audio signal of an audio signal format, at least one metadata parameter; determining for at least one further audio signal of a further audio signal format; at least one further metadata parameter; controlling combining of the at least one metadata parameter with the at least one further metadata parameter to generate a combined metadata, wherein the combined metadata is configured to be associated with a combined audio signal formed from the at least one first audio signal and the at least one further audio signal in such a way that the combined metadata comprises at least one spatial audio parameter.

According to an sixth aspect there is provided an apparatus comprising: first metadata determining circuitry configured to determine for at least one first audio signal of an audio signal format, at least one metadata parameter; further metadata determining circuitry configured to determine for at least one further audio signal of a further audio signal format; at least one further metadata parameter; controlling circuitry configured to control a combination of the at least one metadata parameter with the at least one further metadata parameter to generate a combined metadata, wherein the combined metadata is configured to be associated with a combined audio signal formed from the at least one first audio signal and the at least one further audio signal in such a way that the combined metadata comprises at least one spatial audio parameter.

According to a seventh aspect there is provided a computer readable medium comprising program instructions for causing an apparatus to perform at least the following: determining for at least one first audio signal of an audio signal format, at least one metadata parameter; determining for at least one further audio signal of a further audio signal format; at least one further metadata parameter; controlling combining of the at least one metadata parameter with the at least one further metadata parameter to generate a combined metadata, wherein the combined metadata is configured to be associated with a combined audio signal formed from the at least one first audio signal and the at least one further audio signal in such a way that the combined metadata comprises at least one spatial audio parameter.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
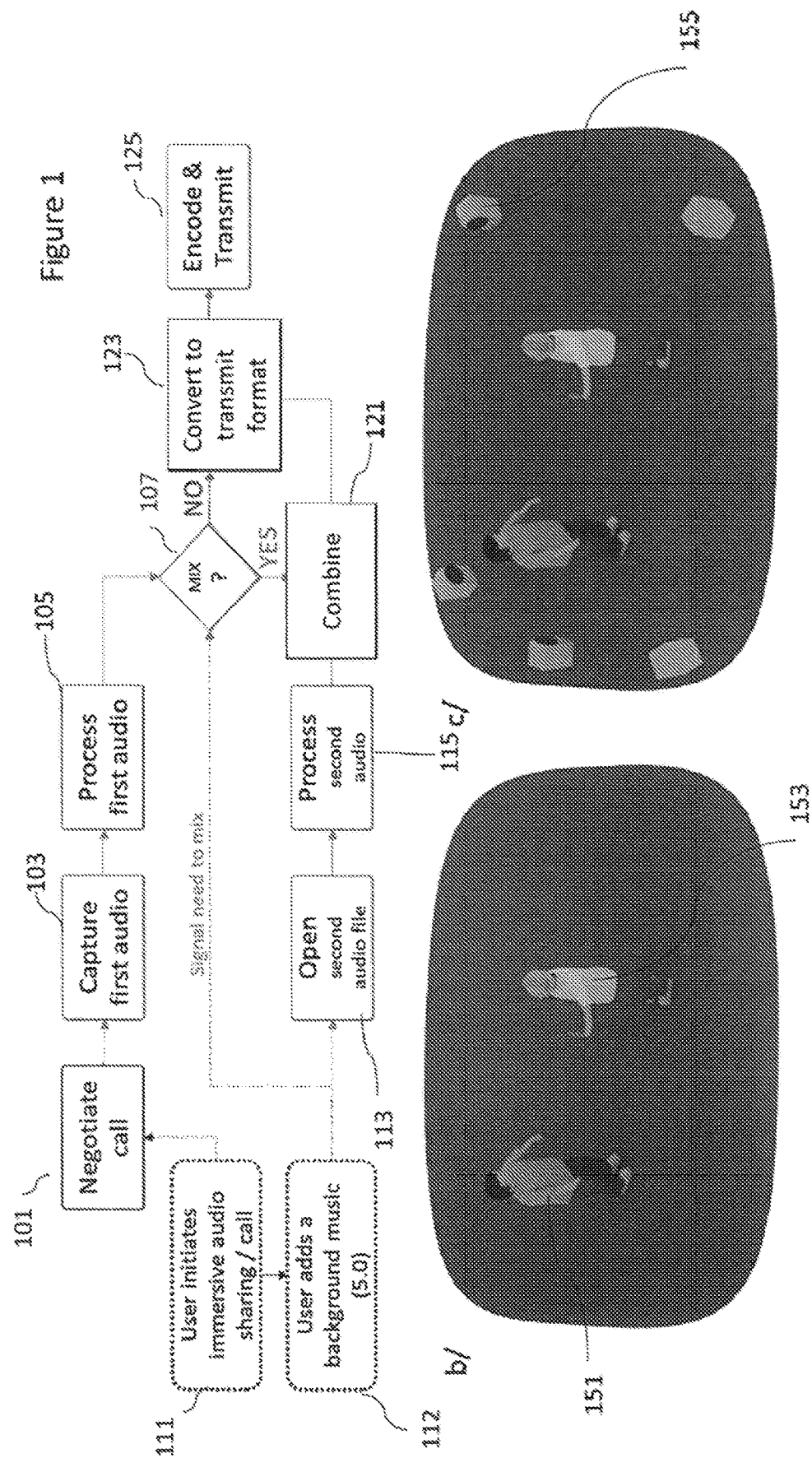
FIG. 1 shows schematically an example combining scenario according to some embodiments.

The following describes in further detail suitable apparatus and possible mechanisms for the provision of effective merging or combining of spatial metadata parameters.

As discussed previously parametric spatial audio can be used in various forms of telecommunications (for example these can include one-to-one immersive calls or telepresence, multi-user teleconferencing, etc.). In these contexts, it can often happen that there are multiple streams of parametric spatial audio. In other words there may be multiple audio and metadata streams with multiple sources (e.g., spatial microphone grid, premixed 5.1, etc.) in the same client or server node. However, in transmission of audio, it is often desired that minimal bitrate is used. This is especially true in mobile communication where transmission channel can occasionally become very limited and efficient transmission is therefore important.

The concept as discussed in the embodiments in further detail hereafter is to merge the streams (by mixing or some other combining method) before transmission. The embodiments achieve this without the need to convert the signals into a common non-parametric audio format (e.g., B-format) and thus are computationally simpler and avoid any quality decrease through repeated synthesis and analysis operations. The embodiments thus hereafter attempt to produce a direct mixing or combination of the parametric audio formats.

The embodiments therefore describe apparatus and methods that combines multiple streams (for example, a multi-microphone capture spatial audio and channel-based audio) in the parametric domain. In some embodiments, the combination can be implemented as part of the capture processing apparatus/operations and therefore create a combined audio representation that can be used, for example, as an audio codec input. In some embodiments the combination can be carried out inside the audio codec.

For efficient codec operation, in some embodiments the apparatus and operations are implemented outside the codec thus producing a single input stream. This has, for example, the advantage of reducing the number of streams to be encoded, which can reduce the associated codec mode selection and compression complexity.

In these embodiments, the audio is first analysed for spatial parameters and transport signals are generated (in other words the audio signal is converted to a suitable parametric format). Then, produced parametric signals are combined. This can be based on associated bitrate requirement. An example implementation which may use more bitrate is to combine the transport signals and add a new spatial metadata block into spatial metadata or modify the spatial metadata by adding, e.g., a second analysed direction. Alternatively, in some embodiments a bitrate reducing option is to fully combine the spatial metadata from the two sources in addition to combining the transport signals.

In some embodiments user and/or the mixing (combining) service (e.g., on the device, on a conference bridge, or in the network) can generate and apply weighting to the combination for a specific stream.

With respect to FIG. 1 is schematically presented an example combining scenario according to some embodiments. In this example the combination is made for an interactive call wherein a call is initialised and then capture is started but in some embodiments the capture and/or audio background signals are started prior to the call being made or in a pure recording scenario the capture and audio signal selection made and the combination made independently of the making of a call. For example, some embodiments can be implemented in a capture pre-processing system prior to encoding.

In this example the apparatus under the control of the user is configured to initiate or negotiate the call as shown in FIG. 1 by step 101. An example of a call being negotiated (or one end of a video or audio-only capture being implemented) is shown in FIG. 1 by the bottom left image part which shows a user 153 operating a mobile device and attempting to capture the other user 151 using the cameras and microphones.

The operation of capturing the first audio is shown in FIG. 1 by step 103.

Furthermore in some embodiments the first audio is then processed to generate suitable transport audio signals and spatial metadata as shown in FIG. 1 by step 105.

The processed transport audio signals and spatial metadata may then be passed to a 'direct' mixer as discussed in further detail hereafter.

While the call is being initialised/negotiated or actually during the call (or more generally before the video or audio-only capture is to be captured or during the capture process) the user 153 may be able to configure the apparatus to initialise an immersive audio augmentation as shown in FIG. 1 by step 111. In some embodiments this may be activated based on interaction with user interface elements such as displayed icons to launch a regular mono call and an immersive call. In addition, in some embodiments, there may be immersive audio streaming/sharing services for example on 3GPP devices. In such embodiments a user can initiate an immersive call. The user initiating an immersive sharing may use a defined streaming service, which has at least immersive audio (for example the service may also have traditional video or VR video). This is then followed by the call negotiation 101.

In some embodiments audio capture 103 may be captured before the call is initiated, and is not transmitted to anyone prior to the call being established.

Adding a background music 112 (or any other relevant audio augmentation) may then be implemented via the immersive audio call/augmentation app anytime during the call. Thus, the call can begin with background music added or the user may, for example, add the music 5 minutes into the call.

Thus for example the user may be able to configure the apparatus to add in a background music audio signal, for example a 5.0 channel audio signal 155 as shown in FIG. 1 by step 112. This selection may in some embodiments be passed to the direct mixer configured to mix the captured audio (in the form of suitable transport audio signals and spatial metadata) and the background music audio signal.

The background music audio signal (the second audio signal) may be retrieved or opened as shown in FIG. 1 by step 113.

Furthermore the background audio signal (the second audio signal) may be processed to generate suitable second audio signal transport audio signals and spatial metadata and pass this to the mixer.

In some embodiments the apparatus may be configured to determine whether the mixer is to directly mix the first and second audio signal as shown in FIG. 1 by step 107.

Where the apparatus is configured not to mix the first and second audio signals (including the example where there is only a first audio) then the first audio signal only is passed to the encoder for transmission where the apparatus is configured to mix the first and second audio signals then there is a direct mixing or combining of the transport audio signals and spatial metadata as shown in FIG. 1 by step 121.

The apparatus may then in some embodiments convert the mixed (or unmixed) transport audio signals and spatial metadata into a suitable input format for encoding and transmitting as shown in FIG. 1 by step 123.

The apparatus may then be configured to transmit (or store) the encoded bit-stream comprising the first and second audio signals as shown in FIG. 1 by step 125.

Figure 2:
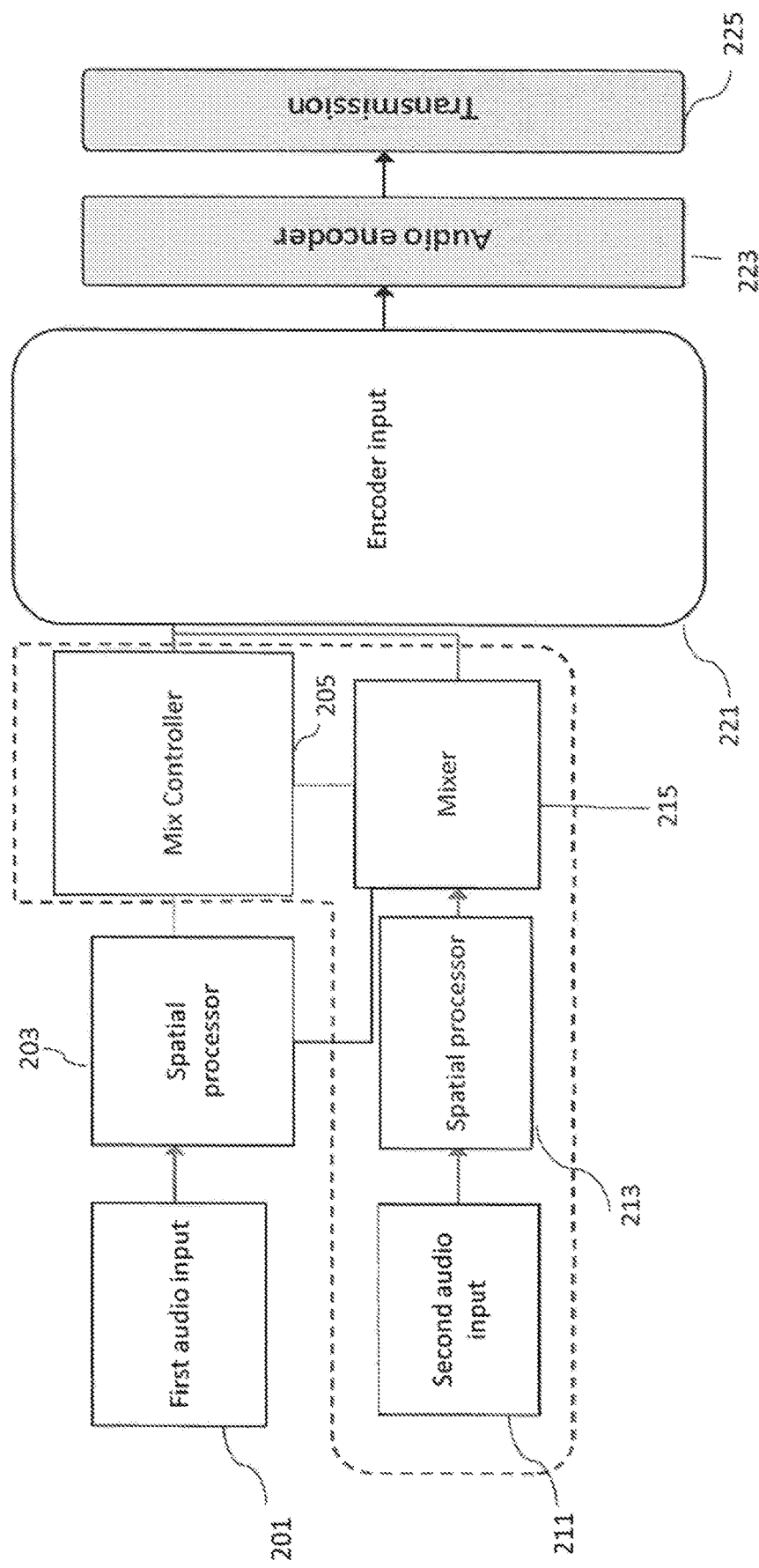
FIG. 2 shows schematically an example pre-processor with mixer according to some embodiments.
Figure 3:
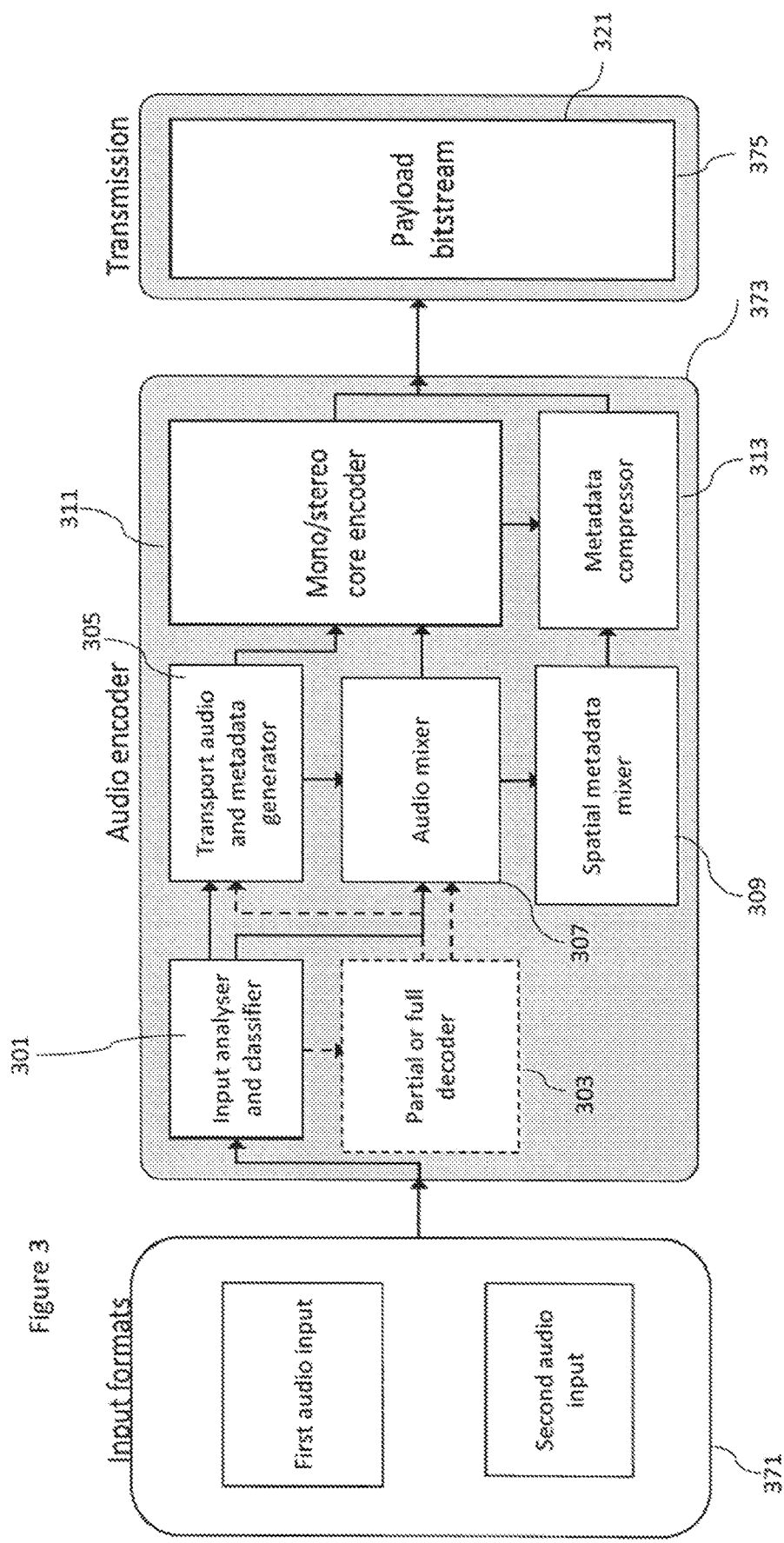
FIG. 3 shows an example processor following combining according to some embodiments.

With respect to FIGS. 2 and 3 are shown an example mixer implementation according to some embodiments.

The example implementation as shown in FIG. 2 presents the implementation in a pre-processing of audio and input format generation. In the pre-processing example all the mixing is performed prior to encoding (and prior to an encoder "seeing" the streams). With respect to an encoding viewpoint and implementation this is thus the most straightforward implementation.

FIG. 2 therefore shows an example first audio input 201 configured to receive the first audio signal. The first audio input signal may for example be a captured, in other words microphone or microphone array audio signal comprising one or more channels of audio signals. The input signal may be one of any suitable formats of which the following examples describe the input signal being 2-N channels of a spatial microphone array that is analysed with microphone array methods. However other suitable input signal formats include 2-N channels of premixed multi-channel audio that are analysed with channel-based analysis methods, first order ambisonics (FOA) or higher order ambisonics (HOA) signals that are analysed from FOA using suitable methods or object based audio signals, that comprise direction metadata and may further comprise other spatial parameters.

However any suitable audio signal may be input, for example a multichannel (surround sound) audio signal, a synthetic multichannel audio signal, an ambisonic audio signal, and/or an object based audio signal.

The apparatus furthermore comprises a spatial processor 203 configured to receive the first audio signal and generate from the first audio signal a transport audio signal (which may in some embodiments be a downmix of the first audio signal, a selection of one or more channels of the audio signal, or any suitable rationalisation of the first audio signal). Furthermore the spatial processor may be configured to generate suitable spatial metadata, such as direction parameters (which may include elevation, azimuth and/or distance), energy ratio parameters, and other suitable spatial parameters.

The first audio signal parameters and the transport audio signal may be passed to the mixer 215.

FIG. 2 furthermore shows an example second audio input 211 configured to receive the second audio signal. The second audio input signal may for example be a multichannel (speaker) audio signal comprising two or more channels of audio signals. However any suitable audio signal may be input, for example a multichannel microphone captured audio signal, a synthetic multichannel audio signal, an ambisonic audio signal, and/or an object based audio signal.

The apparatus furthermore comprises a further spatial processor 213 configured to receive the second audio signal and generate from the second audio signal a transport audio signal (which may in some embodiments be a downmix of the second audio signal, a selection of one or more channels of the second audio signal, or any suitable rationalisation of the second audio signal). Furthermore the spatial processor may be configured to generate suitable spatial metadata, such as direction parameters (which may include elevation, azimuth and/or distance), energy ratio parameters, and other suitable spatial parameters.

The second audio signal parameters and the transport audio signal may be passed to the mixer 215.

In some embodiments the apparatus comprises a mix controller 205. The mix controller in some embodiments may be configured to control the mixing of the audio signals as described in further detail hereafter. As such in some embodiments the mix controller 205 may be configured to receive user inputs and/or the audio signals and/or parameters (for example energy parameters) based on the audio signals.

The apparatus may furthermore comprise a mixer 215. The mixer 215 may be configured to receive the first and second audio signals and furthermore the controls from the mix controller 205 and be configured to generate a mix of the two directly using the examples presented herein.

The output of the mixer 215 may be passed to the encoder input 221 configured to receive the mixed audio signals and in some embodiments generate a suitable format to be processed by the encoder.

The encoder 223 is configured to receive the mixed audio signals and generate suitable encoded audio signals (comprising the transport audio signal(s) and the combined metadata) and output it to a transmitter.

The transmitter 225 may receive the encoded audio signal and transmit it or store it for further use.

With respect to FIG. 3 is shown an example implementation wherein the mixing is implemented within the encoder, where at least one spatial metadata based input and at least one channel-based input can be combined into a single spatial metadata representation which may then be encoded for transmission.

In some embodiments the mixing may be implemented at any suitable apparatus, for example within a server receiving or retrieving the audio signals and/or the decoder configured to receive the audio signals. Thus for example in some embodiments the encoder may be configured in a suitable uplink format to communicate the captured audio signals in a partially or fully encoded form and an indication of the 'background' multichannel audio signal to be mixed (and/or the 'background' multichannel audio signal to be mixed). These audio signals are them mixed and encoded within the server and a in a suitable downlink format communicated to a renderer/decoder.

Similarly in some embodiments the encoder may be configured to transmit the captured audio signals in a partially or fully encoded form and an indication of the 'background' multichannel audio signal to be mixed (and/or the 'background' multichannel audio signal to be mixed) to a decoder or renderer which may then mix and store the audio signals for later consumption or render the combined audio signals.

In such an implementation as shown in FIG. 3 a channel-based audio signal may require transport signal generation and metadata extraction (in other words a spatial analysis). This may then be followed by audio mixing and metadata mixing stages.

In some embodiments, a partial or full decoding of at least one audio input may be included in the encoder before the mixing and/or before the generation of the suitable transmission format.

The apparatus in this embodiment comprises an encoder input 371. The encoder input may be configured to receive a first audio signal. The first audio input signal may for example be a captured, in other words microphone or microphone array audio signal comprising two or more channels of audio signals. However any suitable audio signal may be input, for example a multichannel (surround sound) audio signal, a synthetic multichannel audio signal, an ambisonic audio signal, and/or an object based audio signal.

The encoder input 371 may furthermore be configured to receive a second audio signal. The second audio input signal may for example be a multichannel (speaker) audio signal comprising two or more channels of audio signals. However any suitable audio signal may be input, for example a multichannel microphone captured audio signal, a synthetic multichannel audio signal, an ambisonic audio signal, and/or an object based audio signal.

The encoder 373 may comprise an input analyser and classifier 301. The input analyser and classifier 301 may be configured to receive the first and second audio signals and determine whether it is required to generate spatial metadata associated with the first and second audio signals, whether the first or second audio signal is to be partially or fully decoded, and furthermore generate controls for the mixing of the first and second audio signals.

The encoder 373 may furthermore comprise a partial/full decoder 303 configured when controlled to partially or fully decode an audio signal and pass the decoded audio signal to the audio mixer 307 and/or the transport signal generator and metadata generator 305.

The encoder may furthermore comprise a transport signal generator and metadata generator 305. The transport signal generator and metadata generator 305 may be configured to receive the first and/or second audio signals and/or the partially/fully decoded first and/or second audio signals and from these generate suitable transport audio signals (which may in some embodiments be a downmix, a selection of one or more channels of the audio signal, or any suitable rationalisation of the audio signal). Furthermore the transport signal generator and metadata generator 305 may be configured to generate suitable spatial metadata, such as direction parameters (which may be elevation, azimuth and distance), energy ratio parameters, and other suitable spatial parameters for the first and/or second audio signals.

In some embodiments the encoder comprises an audio mixer 307 configured to mix the audio signals and pass these to the core audio encoder 311.

The encoder may furthermore comprise a core audio encoder 311 configured to receive the mixed audio signals and generate a suitable mono/stereo or other core audio coding.

In some embodiments the encoder comprises a metadata mixer 309 configured to mix or merge the metadata associated with the first and second audio signals.

The encoder may furthermore comprise a metadata compressor 313 the metadata compressor may receive the mixed or merged metadata and perform a suitable metadata compression prior to transmission/storage.

The apparatus furthermore may comprise a transmitter/storage 375 configured to receive the compressed audio and metadata and transmit and/or store it in the form of payload bitstream 321 or similar.

Having discussed example apparatus within which the mixing may occur the following discussion describes in further detail three example direct metadata merging (or mixing or combining) methods. These methods are configured to merge a number of independent streams into a single format or stream representation as discussed in further detail hereafter be divided to three main methods:

A first example may be one in which metadata is combined by adding an additional analyzed direction block to the spatial metadata. This requires that the direction metadata format matches on both directional metadata streams or a conversion has to be done. Transport signals may in some embodiments also be combined but can be transmitted separately. This method may be able to produce high quality and require relatively low complexity at the potential expense of that the bitrate is high if channel signals are sent separately.

Figure 4:
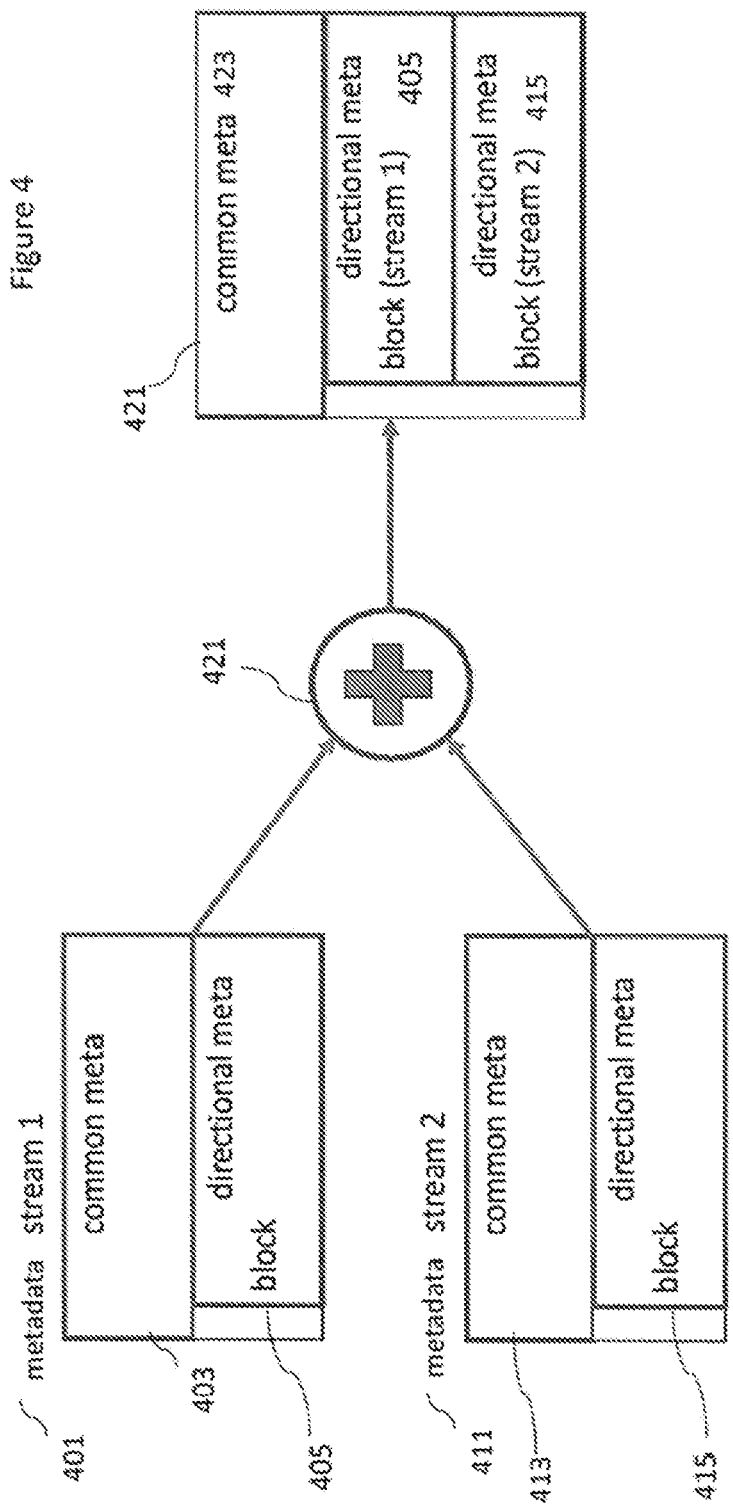
FIG. 4 shows schematically a first example of a mixer according to some embodiments.

With respect to FIG. 4 the first example direct metadata mixing or merging implementation is shown in further detail.

The simplest form of combining two streams, shown in FIG. 4 as metadata stream 1 401 comprising a common metadata part 403, which comprises a directional metadata block 405 and metadata stream 2 411 comprising common metadata part 413 and directional metadata block 415 is to take the direction metadata block from one spatial metadata stream and add it into the other spatial metadata stream as a secondary direction metadata block. Thus for example the mixer 421 receives the metadata stream 1 401 and metadata stream 2 411 and outputs the combined metadata stream 421. The combined metadata stream comprises the common metadata part 423 (which may be one or other or a combination of the common metadata parts 403, 413) and which further comprises the directional metadata block 405 associated with the metadata stream 1 and the directional metadata block 415 associated with the metadata stream 2.

This process can be implemented so that it requires no or only partial decoding of the spatial metadata and thus may be computationally very efficient. Furthermore in some embodiments the transport signals can be combined in a separate process or and in some other embodiments the transport signals are transmitted forward or stored without combination.

Figure 5:
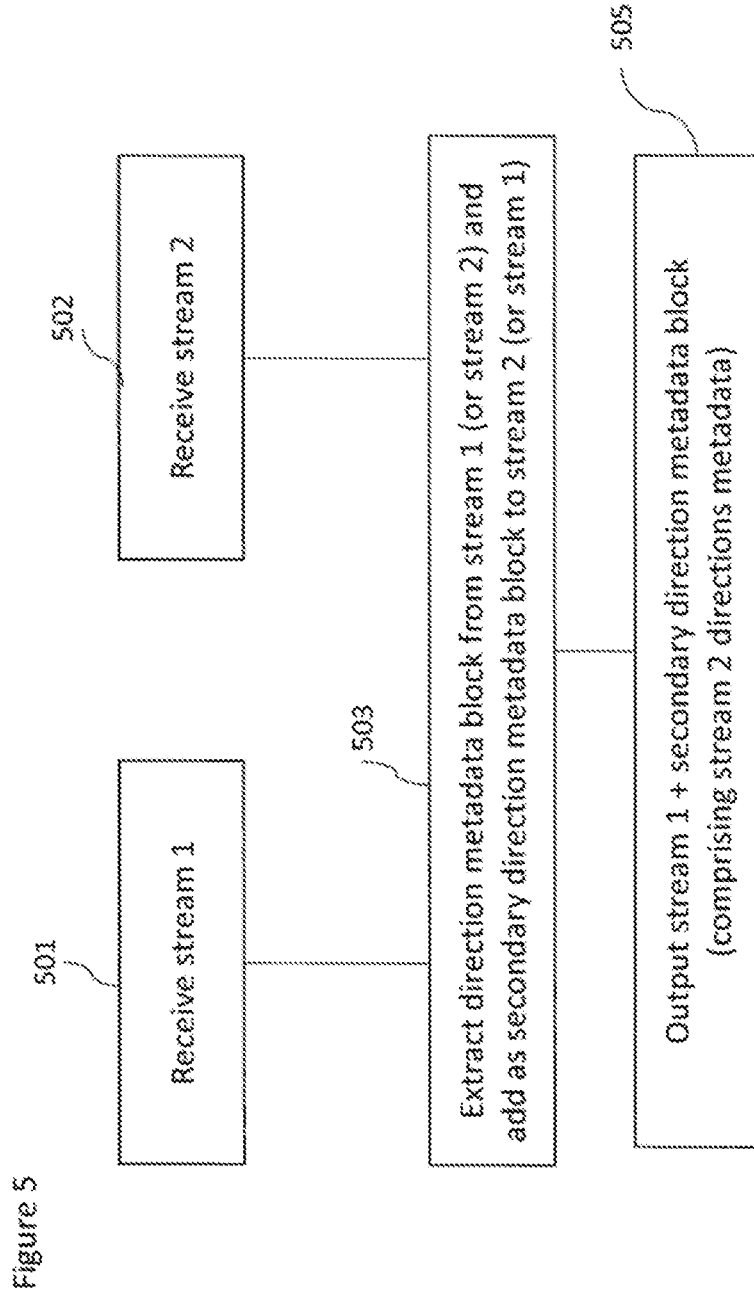
FIG. 5 shows a flow diagram of the operation the first example of the mixer according to some embodiments.

With respect to FIG. 5 is therefore shown in summary the operation the first direct metadata mixing method.

An operation of receiving stream 1 as shown in FIG. 5 by step 501.

Another operation of receiving stream 2 as shown in FIG. 5 by step 502.

Having received the streams 1 and 2 the next operation is that of extracting the direction metadata block from stream 1 (or from stream 2 in some embodiments) and then inserting or adding it into the metadata as a secondary directional metadata block into stream 2 (or into stream 1 in the same other embodiments) as shown in FIG. 5 by step 503.

Having merged the metadata the next operation is one of outputting the stream 2 with the added directional metadata block from stream 1 as the secondary directional metadata block (or in the same other embodiments outputting the stream 1 with the added directional metadata block from stream 2 as the secondary directional metadata block) as shown in FIG. 5 by step 505.

A second example of direct mixing may be one in which metadata is mixed with the help of available channels signals. All underlying transport signals are either decoded or are available prior encoding and are thus known to the metadata mixer. The advantage of this method is potentially even higher perceptual quality, and the transport signals can be mixed at the same time for further transmission, which saves bandwidth downstream. However this method may require higher computational complexity in the mixer. Transport signals are analyzed, and in some scenarios, they have to be decoded as an extra step. This method may also produce additional delays if additional decoding/encoding is done for the spatial metadata mixing, which may happen for example in a conference bridge.

Figure 6:
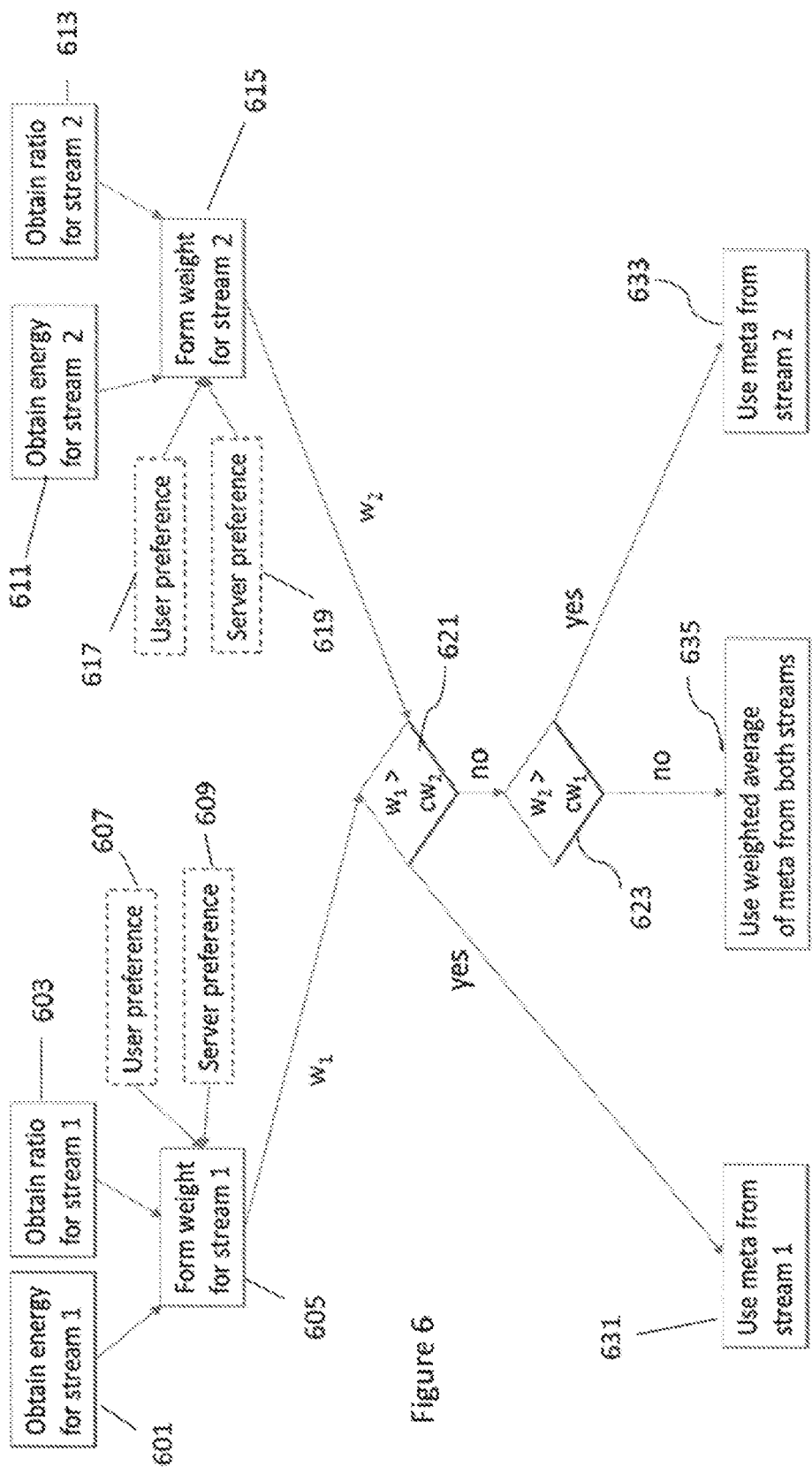
FIG. 6 shows a flow diagram of the operation of the second example of a mixer according to some embodiments.

For example this method is shown with respect to FIG. 6.

With respect to the first stream, stream 1, and for all sub-frames and frequency bands the following operations may be performed by suitable means.

Determine the (average) energy for stream 1 as shown in FIG. 6 by step 601.

Determine an (energy) ratio parameter for stream 1 as shown in FIG. 6 by step 603.

In some optional situations further determine any user preference, for example via a suitable user interface or user input for stream 1 as shown in FIG. 6 by step 607.

Furthermore in some optional situations further determine any server preference, for example via a suitable server input for stream 1 as shown in FIG. 6 by step 609.

The following operation is then to determine a weight-value $w_1$ for stream 1 as shown in FIG. 6 by step 605 and which may be determined as: signal energy multiplied with signal energy ratio (and with the option of combination with the user or server mixing weighting).

With respect to the second stream, stream 2, and for all sub-frames and frequency bands the following operations may be performed by suitable means.

Determine the average energy for stream 2 as shown in FIG. 6 by step 611.

Determine an energy ratio parameter for stream 2 as shown in FIG. 6 by step 613.

In some optional situations further determine any user preference, for example via a suitable user interface or user input for stream 2 as shown in FIG. 6 by step 617.

Furthermore in some optional situations further determine any server preference, for example via a suitable server input for stream 2 as shown in FIG. 6 by step 619.

The following operation is then to determine a weight-value $w_2$ for stream 2 as shown in FIG. 6 by step 615 and which may be determined as: signal energy multiplied with signal energy ratio (and with the option of combination with the user or server mixing weighting).

Based on the weight values then make a decision how to combine metadata according the following criteria.

First check if weight of signal 1 is larger than weight of signal 2 by a large enough measure (e.g., $w_1 > c\, w_2$, where c=1.5) as shown in FIG. 6 by step 621.

Where the check is correct then use metadata solely from signal 1 as shown in FIG. 6 by step 631.

Otherwise check whether weight of signal 2 is larger than weight of signal 1 by a large enough measure (e.g., $w_2 > c\, w_1$, where c=1.5) as shown in FIG. 6 by step 623.

Where the second check is correct then use metadata solely from signal 2 as shown in FIG. 6 by step 633.

Otherwise, use the weights to calculate a weighted average between the parameters as shown in FIG. 6 by step 635.

Although described with two signals, this may be applied to more than two signals (in other words mixing can be performed with any number of signals either directly or by chaining). This method is also valid without access to transport signals if suitable average energy estimates are provided for the mixing process.

In some embodiments the average energy for each subframe and frequency band is calculated with the following equation:

$$E_{avg} = \frac{1}{NKI} \sum_{n=1}^{N} \sum_{k=K_b}^{K_t} \sum_{i=1}^{I} |S(i,k,n)|^2$$

where N is number of time samples in this time frame, $K_b$ and $K_t$ are the current frequency band bottom and top frequency bins, and/is the number of transport channels for this stream. $S(i,k,n)$ is the time-frequency domain representation of the transport signal.

In some embodiments the weight parameter is formed by combining the average energy and energy ratio for the subframe and frequency band. This is done as follows:

$w = rE_{avg}p_{user}p_{server}$ where r is the energy ratio parameter, $p_{user}$ is the user preference weight and and $p_{server}$ is the server preference weight. As mentioned, user and server preferences are an optional inclusion.

The weights as discussed herein are then used to decide how the metadata is combined. If the weight of signal 1 is larger than the weight of signal 2 by the determined threshold, the metadata from the larger weight signal is used for the mixed signal. The same may be applied if signal 2 has a larger weight than signal 1. Furthermore as discussed above where the weights are close, a weighted average of the parameters is used. In some embodiments the weighted average of the parameters may be determined as follows:

$$m_{mix}(i,k) = \begin{cases} m_1(i,k), & w_1 > cw_2 \\ m_2(i,k), & w_2 > cw_1 \\ \dfrac{m_1 w_1 + m_2 w_2}{w_1 + w_2}, & \text{otherwise} \end{cases}$$

Where m(i,k) signifies any single parameter in metadata and c is a predefined limit constant (e.g., 1.5). Note that this limit constant allows transition between strict selection between the two input metadata and weighted average between the two input metadata. With suitable selection of c, it is possible to use just one of these operating modes if desired.

A third example may be one in which metadata is mixed without access to transport signals. In this case, the transport signals are either both transmitted forwards, or are mixed totally independently of the spatial metadata mixing. The advantage of this is that spatial metadata mixing is computationally very light and requires no additional delay. The perceptual quality of this mixing method is reasonable but may not be as good as the previous method. This method may be useful in some apparatus types such as a conference bridge. The potentially lower combined audio quality may not be crucial, e.g., in a teleconference bridge mixing implementation, since participants generally try to avoid talking over each other in teleconferences.

In this method, the two (or more) N-channel+metadata streams are mixed together with no access to the transport signals and therefore the energy values. This method is shown with respect to FIG. 7.

With respect to the first stream, stream 1, and for all sub-frames and frequency bands the following operations may be performed by suitable means.

Figure 7:
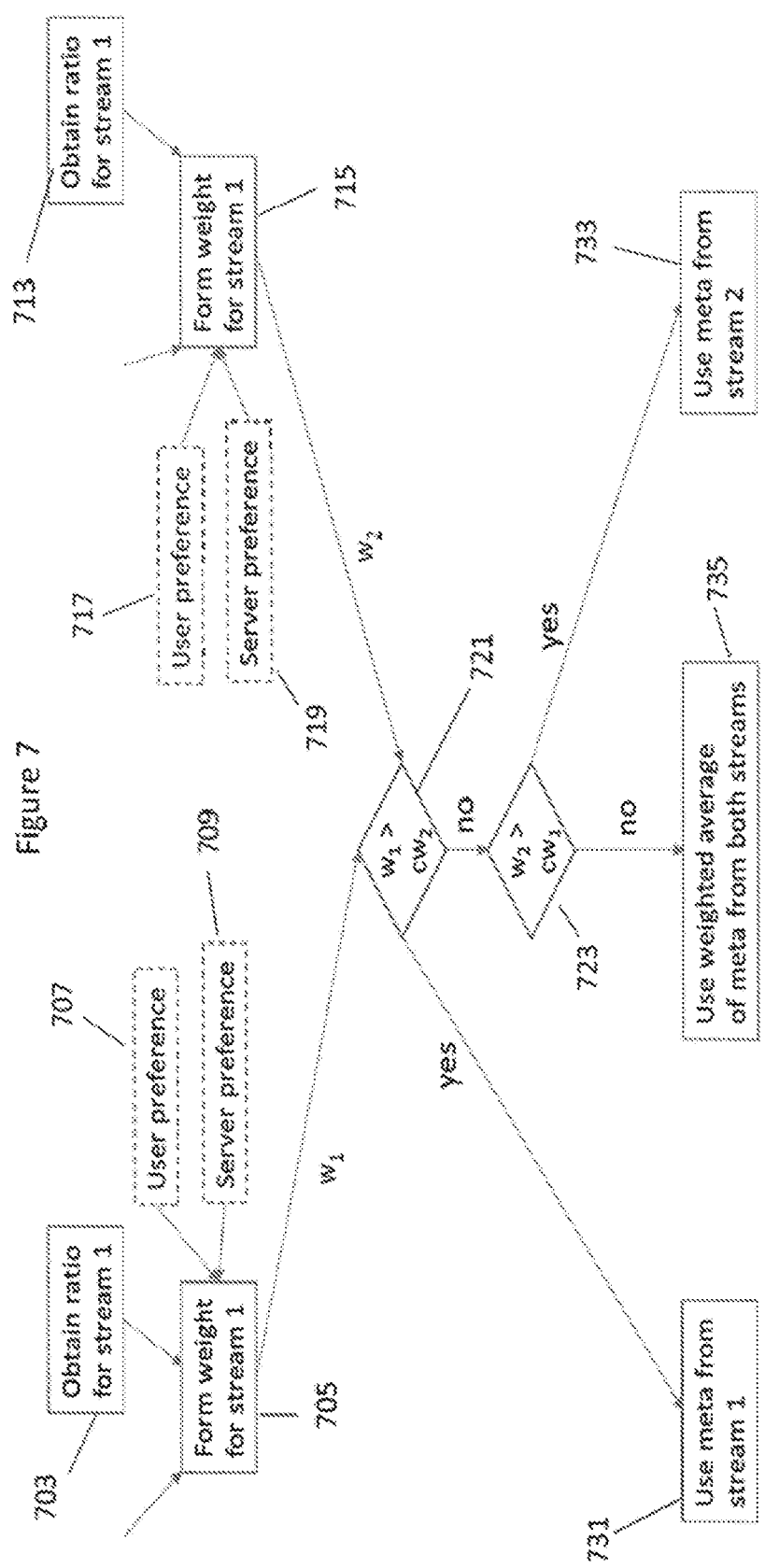
FIG. 7 shows a flow diagram of the operation of the second example of a mixer according to some embodiments.

Determine an energy ratio parameter for stream 1 as shown in FIG. 7 by step 703.

In some optional situations further determine any user preference, for example via a suitable user interface or user input for stream 1 as shown in FIG. 7 by step 707.

Furthermore in some optional situations further determine any server preference, for example via a suitable server input for stream 1 as shown in FIG. 7 by step 709.

The following operation is then to determine a weight-value $w_1$ for stream 1 as shown in FIG. 7 by step 705 and which may be determined as signal energy ratio (and with the option of combination with the user or server mixing weighting).

With respect to the second stream, stream 2, and for all sub-frames and frequency bands the following operations may be performed by suitable means.

Determine an energy ratio parameter for stream 2 as shown in FIG. 7 by step 713.

In some optional situations further determine any user preference, for example via a suitable user interface or user input for stream 2 as shown in FIG. 7 by step 717.

Furthermore in some optional situations further determine any server preference, for example via a suitable server input for stream 2 as shown in FIG. 7 by step 719.

The following operation is then to determine a weight-value $w_2$ for stream 2 as shown in FIG. 7 by step 715 and which may be determined as: signal energy multiplied with signal energy ratio (and with the option of combination with the user or server mixing weighting).

Based on the weight values then make a decision how to combine metadata according the following criteria.

First check if weight of signal 1 is larger than weight of signal 2 by a large enough measure (e.g., $w_1 > c\, w_2$, where c=1.5) as shown in FIG. 7 by step 721.

Where the check is correct then use metadata solely from signal 1 as shown in FIG. 7 by step 731.

Otherwise check whether weight of signal 2 is larger than weight of signal 1 by a large enough measure (e.g., $w_2 > c\, w_1$, where c=1.5) as shown in FIG. 7 by step 723.

Where the second check is correct then use metadata solely from signal 2 as shown in FIG. 7 by step 733.

Otherwise, use the weights to calculate a weighted average between the parameters as shown in FIG. 7 by step 735.

Although described with two signals, this may be applied to more than two signals (in other words mixing can be performed with any number of signals either directly or by chaining). This method is also valid without access to transport signals if suitable average energy estimates are provided for the mixing process.

Thus, this method applies mixing of metadata similar to the second method but with the difference of the formation of the weight values as energy is not available now. The following equation forms the weights in this case.

$$w = rp_{user}p_{server}$$

Figure 8:
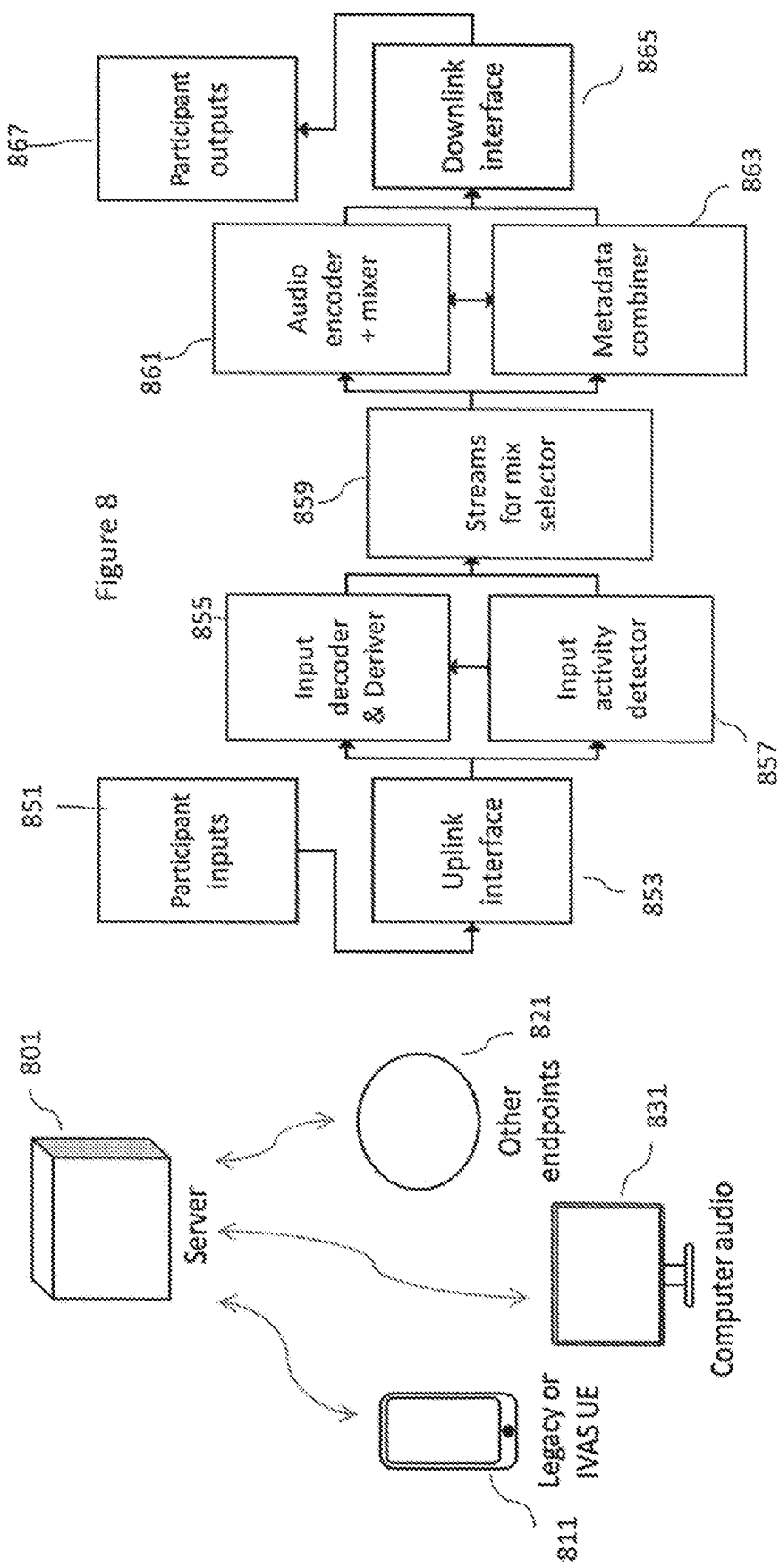
FIG. 8 shows schematically the implementation of a mixer within a conference bridge example according to some embodiments.

As described the apparatus may be implemented as part of a conference bridge equipment. FIG. 8 for example show such an implementation.

In this implementation there may be a server 801 which may be a centralised or cloud or distributed entity configured to perform the mixing and then pass the output to the participant apparatus such as user equipment 811, computer 831 and other apparatus 821 such as virtual reality or augmented reality or mixed reality capture/display apparatus or a conference phone equipment.

In such embodiments the participants may pass the video and audio signals to the participant inputs 851. The participant inputs may be passed to an uplink interface 853. The participant inputs may furthermore be encoded. The uplink interface 853 may then pass the audio signals from the participants and any other audio signals to be mixed (for example selected background audio signals) to an input decoder and audio deriver 855 and to an input activity detector 857. These may respectively decode and/or retrieve and then output the audio and determine spatial audio parameters and pass this to a stream selector 859. The stream selector may select the streams to mix and pass them to the audio encoder and mixer 861 configured to mix the stream transport (or other suitable format) audio signals and the metadata combiner or mixer 863 which is configured to mix the spatial metadata according to the embodiments described herein.

The audio output from the audio encoder and mixer and the spatial metadata from the metadata combiner and mixer 863 may be passed to the downlink interface 865 which outputs the combined audio and metadata to the participants via the participant output 867.

The embodiments as described herein thus enable advanced immersive call implementations related to immersive communications and immersive (audio/media) experience augmentation and streaming. As shown earlier with respect to FIG. 1 a user may be able to perform two actions, first initiating an immersive audio augmentation or immersive audio call where the user is recording at least immersive audio (and may also record video) of himself and a friend in an interesting environment. The user secondly adds a background music track or any other second audio (e.g., a 5.0 studio mix). The experience thus now corresponds to the situation where the capture point is, in addition to recording the real environment, surrounded by a virtual loudspeaker setup providing background music. The user may add the background track by triggering the service on the device to open a second audio (file), process the second audio (into the negotiated format), and to combine the processed second audio with the first audio into one common spatial metadata based representation. This combined audio is fed to the codec, encoded, and transmitted. The addition of the background music does not significantly increase the codec processing overhead, require any re-negotiation, or result in discontinuity or other perceived artefact by the recipient.

In the examples where mixing happens in the encoder instead of prior to the encoder, in some embodiments the apparatus may be configured to provide a signal to the encoder about the role of each audio stream. Such signals may in some embodiments also be included in the payload and thus allow, e.g., independent volume control (at least to some degree) for the recipient.

Figure 9:
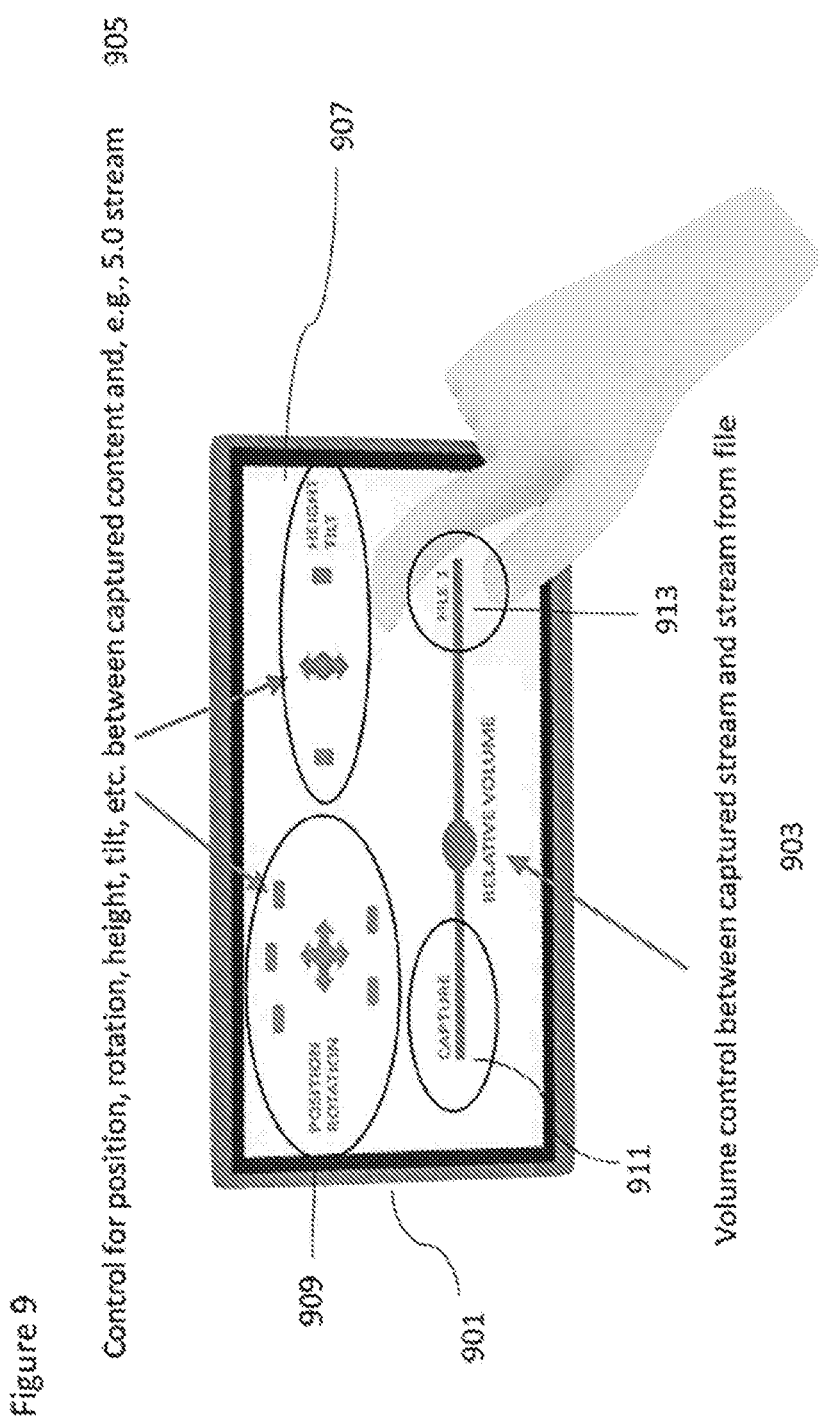
FIG. 9 shows an example user input device control user interface according to some embodiments.

In some embodiments the selection and mixing of the streams may be performed optionally based on user input or preferences. For example FIG. 9 shows an example user interface providing inputs for mixing. Thus for example there may be controls related to the 'position' of the stream relative to the capture position. These position controls 905 may control the orientation and location of the multichannel inputs. Thus for example FIG. 9 shows a plan position 909 showing the difference between the captured content in the centre of the plan position 909 and the multichannel (speaker) audio content surrounding the centre and enable a rotation of one stream relative to the other.

Furthermore FIG. 9 shows an elevation view 907 showing the difference between the captured content in the centre of the elevation view 907 and the multichannel (speaker) audio content surrounding the centre and enable a tilt and height adjustment of one stream relative to the other.

Additionally FIG. 9 shows a slider control 903 for adjusting the volume of one stream (the captured audio 911) relative to the other stream (the multichannel audio file 913).

In some embodiments therefore examples of user control of the alignment and volume level between the captured content (which can be considered a fixed stream configuration relative to the capture device) and the content from at least one file (which can be considered a virtual stream configuration relative to the capture device) can be implemented using any suitable user input interface or device. Additionally to the examples shown, in some embodiments the relative distance of the audio file virtual loudspeaker sources (e.g., a 5.0 or a 7.1 configuration) to their centre point can be changed or adjusted. This can be of particular interest for any parametric configuration that includes a distance parameter and, of course, for any use cases implementing six degrees of freedom.

In some embodiments it may be that some inputs need not be (at least fully) decoded. The mixing of audio for the downlink may not always require audio encoding. For example, this is the case if the uplink audio streams have not been decoded (into waveforms). The combination of the independent metadata based streams may take into account the information related to the audio signals, or the mixing of the metadata may be done independently.

Figure 10:
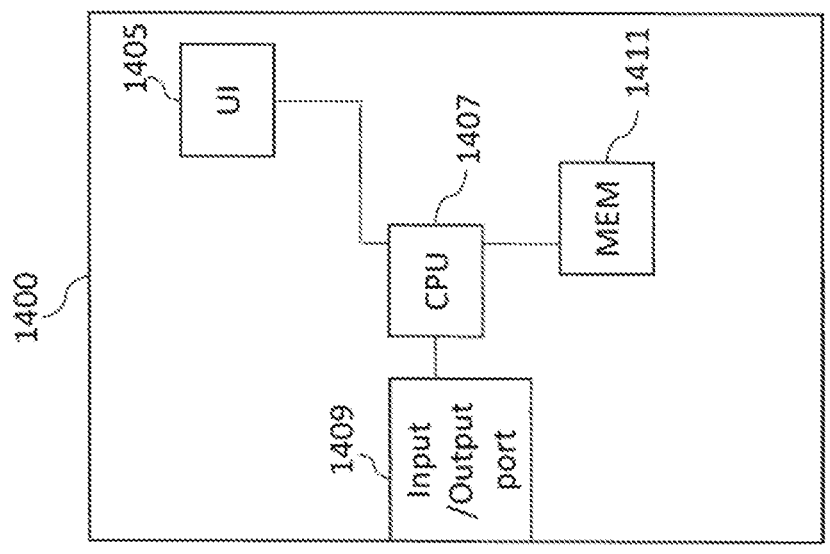
FIG. 10 shows schematically an example device suitable for implementing the apparatus shown herein.

With respect to FIG. 10 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the loudspeaker signals and in some embodiments determine the parameters as described herein by using the processor 1407 executing suitable code. Furthermore the device may generate a suitable transport signal and parameter output to be transmitted to the synthesis device.

In some embodiments the device 1400 may be employed as at least part of the synthesis device. As such the input/output port 1409 may be configured to receive the transport signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
at least one processor; and
at least one memory including instructions that, when executed by the at least one processor, cause the apparatus at least to perform:
determining, for at least one first audio signal of an audio signal format, multiple metadata parameters comprising at least one spatial audio parameter and at least one first audio signal energy parameter;
determining, for at least one further audio signal of a further audio signal format, multiple further metadata parameters comprising at least one further spatial audio parameter and at least one further audio signal energy parameter;
determining a value based on multiplication of the determined multiple metadata parameters;
determining a further value based on multiplication of the determined multiple further metadata parameters;
comparing the value and the further value to select at least one of: the at least one spatial audio parameter from the determined multiple metadata parameters, or the at least one further spatial audio parameter from the multiple further metadata parameters; and
generating a metadata based on the selection, the generated metadata comprising at least one of: the at least one spatial audio parameter; or the at least one further spatial audio parameter, wherein the generated metadata is configured to be associated with a combined audio signal formed based on the at least one first audio signal and the at least one further audio signal.

2. The apparatus as claimed in claim 1, wherein:
determining the multiple metadata parameters comprises:
(1) analysing the at least one first audio signal to determine at least one of the multiple metadata parameters; or
(2) decoding the at least one first audio signal to determine at least one of the multiple metadata parameters; and
determining the multiple further metadata parameters comprises:
(1) analysing the at least one further audio signal to determine at least one of the multiple further metadata parameters; or
(2) decoding the at least one further audio signal to determine the at least one of the multiple further metadata parameters.

3. The apparatus as claimed in claim 1, wherein the generated metadata is configured to be generated based on:
extracting, as a metadata block, the multiple metadata parameters from the at least one first audio signal, the multiple further metadata parameters from the at least one further audio signal, or both the multiple metadata parameters from the at least one first audio signal and the multiple further metadata parameters from the at least one further audio signal; and
adding the extracted metadata block as a secondary metadata block within the generated metadata.

4. The apparatus as claimed in claim 3, wherein the extracted metadata block comprises
at least one direction parameter;
at least one energy ratio parameter; or
at least one coherence parameter associated with at least one of the at least one first audio signal or the at least one further audio signal.

5. The apparatus as claimed in claim 3, wherein the apparatus is configured, based upon the adding of the secondary metadata block, to cause the apparatus to add at least one of:
at least one direction parameter;
at least one energy ratio parameter; or
at least one coherence parameter associated with at least one of the at least one first audio signal or the at least one further audio signal.

6. The apparatus as claimed in claim 3, wherein the generated metadata comprises:
at least one primary metadata block comprising at least one spatial audio parameter based on the at least one first audio signal, the at least one further audio signal, or both the at least one first audio signal and the at least one further audio signal, wherein the at least one spatial audio parameter comprises at least one of the following: (1) at least one direction parameter; (2) at least one energy ratio parameter; or (3) at least one coherence parameter associated with the at least one first audio signal, the at least one further audio signal, or both the at least one first audio signal and the at least one further audio signal; and
a common metadata block based on the at least one first audio signal, the at least one further audio signal, or both the at least one first audio signal and the at least one further audio signal, wherein the common metadata block comprises at least one non-spatial audio related parameter comprising at least one of the following: (1) a version identifier; (2) a time-frequency resolution identifier; or (3) a number of directions identifier.

7. The apparatus as claimed in claim 1, wherein:
determining the multiple metadata parameters comprises:
  determining the at least one first audio signal energy parameter as one of the metadata parameters that are based on the at least one first audio signal; and
  determining the at least one spatial audio parameter as another of the metadata parameters that are based on the at least one first audio signal;
determining the value based on multiplication of the determined multiple metadata parameters comprises generating a first signal weight as the value based on multiplying the at least one first audio signal energy parameter by the at least one spatial audio parameter;
determining multiple further metadata parameters comprises:
  determining the at least one further audio signal energy parameter based as one of the further metadata parameters that are based on the at least one further audio signal; and
  determining the at least one further spatial audio parameter as another of the metadata parameters that are based on the at least one first audio signal;
determining the further value based on multiplication of the determined multiple further metadata parameters comprises generating a further signal weight as the further value based multiplying the at least one further audio signal energy parameter by the at least one further spatial audio parameter;
comparing the value and the further value further comprises comparing the first signal weight and the further signal weight; and
generating the metadata further comprises generating the metadata based on the comparing the first signal weight and the further signal weight.

8. The apparatus as claimed in claim 7, wherein the at least one memory include further instructions that, when executed by the at least one processor, cause the apparatus at least to generate the metadata based on the comparing of the first signal weight and the further signal weight to further cause the apparatus to:
use at least one of the multiple metadata parameters based on the at least one first audio signal as the generated metadata when the comparing indicates the first signal weight is greater than the further signal weight by a determined threshold;
use at least one of the multiple further metadata parameters based on the at least one further audio signal as the generated metadata when the comparing indicates the further signal weight is greater than the first signal weight by a further determined threshold; and
generate a weighted average of the at least one further metadata parameter and the at least one metadata parameter when the comparing indicates otherwise.

9. The apparatus as claimed in claim 7, wherein:
the at least one memory includes further instructions that, when executed by the at least one processor, cause the apparatus at least to perform:
  determining at least one first signal user input associated with the at least one first audio signal; and
  determining at least one further signal user input associated with the at least one further audio signal;
generating the first signal weight further comprises generating the first signal weight based on the multiplying the at least one first audio signal energy parameter by the at least one spatial audio parameter and further based on the at least one first signal user input; and
generating the further signal weight further comprises generating the further signal weight based on the multiplying the at least one further audio signal energy parameter by the at least one further spatial audio parameter and further based on the at least one further signal user input.

10. The apparatus as claimed in claim 7, wherein:
the at least one memory includes further instructions that, when executed by the at least one processor, cause the apparatus at least to perform:
  determining at least one first signal server input associated with the at least one first audio signal; and
  determining at least one further signal server input associated with the at least one further audio signal;
generating the first signal weight further comprises generating the first signal weight based on the multiplying the at least one first audio signal energy parameter by the at least one spatial audio parameter and further based on the at least one first signal server input; and
generating the further signal weight further comprises generating the further signal weight based on multiplying the at least one further audio signal energy parameter by the at least one further spatial audio parameter and further based on the at least one further signal server input.

11. The apparatus as claimed in claim 1, wherein the at least one first audio signal of the audio signal format is at least one of:
2-N channels of a spatial microphone array;
2-N channels of multi-channel audio signal;
a first order ambisonics signal;
a higher order ambisonics signal; or
a spatial audio signal.

12. The apparatus as claimed in claim 1, wherein the at least one further audio signal of the further audio signal format is at least one of:
2-N channels of a spatial microphone array;
2-N channels of multi-channel audio signal;
a first order ambisonics signal;
a higher order ambisonics signal; or
a spatial audio signal.

13. The apparatus as claimed in claim 1, wherein the generating the metadata further comprises:
in response to the value being larger than the further value by a first provided measure, generating the generated metadata using at least one of the multiple metadata parameters; and
in response to the further value being larger than the value by a second provided measure, generating the generated metadata using at least one further metadata parameter.

14. The apparatus as claimed in claim 13, wherein the generating the metadata further comprises:
in response to the value not being larger than the further value by the first provided measure and the further value not being larger than the first value by the second provided measure, generating the generated metadata using a weighted average of at least one of the multiple metadata parameters and at least one of the multiple further metadata parameters.

15. The apparatus as claimed in claim 1, wherein the at least one memory further includes instructions that, when executed by the at least one processor, cause the apparatus to compare the value and the further value to select at least one of the multiple metadata parameters, at least one of the multiple further metadata parameters, or both the at least one metadata parameter and the at least one further metadata parameter to generate the metadata.

16. The apparatus as claimed in claim 1, wherein the comparing further comprises comparing the value and the further value to select one of the following to be used to generate a metadata: at least one of the multiple metadata parameters, or at least one of the multiple further metadata parameters, or both the at least one metadata parameter and the at least one further metadata parameter.

17. A method comprising:
  determining, for at least one first audio signal of an audio signal format, multiple metadata parameters comprising at least one spatial audio parameter and at least one first audio signal energy parameter;
  determining, for at least one further audio signal of a further audio signal format, multiple further metadata parameters comprising at least one further spatial audio parameter and at least one further audio signal energy parameter;
  determining a value based on multiplication of the determined multiple metadata parameters;
  determining a further value based on multiplication of the determined multiple further metadata parameters;
  comparing the value and the further value to select at least one of: at least one spatial audio parameter from the determined multiple metadata parameters, or the at least one further spatial audio parameter from the multiple further metadata parameters; and
  generating a metadata based on the selection, the generated metadata comprising at least one of: the at least one spatial audio parameter; or the at least one further spatial audio parameter, wherein the generated metadata is configured to be associated with a combined audio signal formed based on the at least one first audio signal and the at least one further audio signal.

18. The method as claimed in claim 17, wherein:
  determining the multiple metadata parameters comprises at least one of the following:
    (1) analysing the at least one first audio signal to determine at least one of the multiple metadata parameters; or
    (2) decoding the at least one first audio signal to determine at least one of the multiple metadata parameters; and
  determining the multiple further metadata parameters comprises at least one of the following:
    (1) analysing the at least one further audio signal to determine at least one of the multiple further metadata parameters; or
    (2) decoding the at least one further audio signal to determine at least one of the multiple further metadata parameter.

19. The method as claimed in claim 17, wherein generating further comprises:
  extracting, as a metadata block, the multiple metadata parameters from the at least one first audio signal, the multiple further metadata parameters from the at least one further audio signal, or both the multiple metadata parameters from the at least one first audio signal and the multiple further metadata parameters from the at least one further audio signal; and
  adding the extracted metadata block as a secondary metadata block within the generated metadata.

20. The method as claimed in claim 17, wherein the comparing further comprises comparing the value and the further value to select one of the following to be used to generate a metadata: at least one of the multiple metadata parameters, or at least one of the multiple further metadata parameters, or both the at least one metadata parameter and the at least one further metadata parameter.

* * * * *